United States Patent
Bruneau et al.

(10) Patent No.: US 11,987,139 B2
(45) Date of Patent: May 21, 2024

(54) ELECTRIC MOTOR CONTROL BASED ON WATER INTAKE SENSOR

(71) Applicant: TAIGA MOTORS INC., Lasalle (CA)

(72) Inventors: Paul Bruneau, Montreal (CA); Samuel Bruneau, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 212 days.

(21) Appl. No.: 17/724,922

(22) Filed: Apr. 20, 2022

(65) Prior Publication Data

US 2022/0363136 A1 Nov. 17, 2022

Related U.S. Application Data

(60) Provisional application No. 63/186,964, filed on May 11, 2021.

(51) Int. Cl.
| | |
|---|---|
| *B60L 3/00* | (2019.01) |
| *B60L 15/20* | (2006.01) |
| *B63B 79/10* | (2020.01) |
| *B63B 79/40* | (2020.01) |
| *B63H 21/17* | (2006.01) |

(Continued)

(52) U.S. Cl.
CPC ............. *B60L 3/0061* (2013.01); *B60L 15/20* (2013.01); *B63B 79/10* (2020.01); *B63B 79/40* (2020.01); *B63H 21/17* (2013.01); *B63H 21/21* (2013.01); *H02P 23/24* (2016.02); *B60L 2250/00* (2013.01)

(58) Field of Classification Search
CPC .......... H02P 27/00; H02P 27/04; H02P 27/06; H02P 27/08; H02P 3/00; H02P 3/06; H02P 3/08; H02P 6/08; H02P 6/24; H02P 7/00; H02P 25/00; H02P 25/022; H02P 25/062; H02P 25/064; H02P 25/03; H02P 25/08; H02P 25/107; H02P 25/14; H02P 29/00; H02P 29/024; H02P 29/032; H02P 2207/05; H02P 23/24; B63B 79/40; B63B 79/10; B63B 34/10; B63B 3/14; B63H 21/17; B63H 11/08; B63H 2021/216
See application file for complete search history.

(56) References Cited

U.S. PATENT DOCUMENTS

| | | |
|---|---|---|
| 5,200,066 A | 4/1993 | Jorgensen |
| 5,643,019 A | 7/1997 | Barnett et al. |

FOREIGN PATENT DOCUMENTS

| | | | | |
|---|---|---|---|---|
| JP | H05229481 A | * | 9/1993 | ............ B63H 11/01 |

OTHER PUBLICATIONS

Sea-Doo, 2021 Sea-Doo iDF Intelligent Debris Free Pump System, Sep. 10, 2020, https://www.youtube.com/watch?v=DTWJjks1d5U&ab_channel=Sea-Doo, accessed on Apr. 6, 2022.

* cited by examiner

*Primary Examiner* — Antony M Paul
(74) *Attorney, Agent, or Firm* — Norton Rose Fulbright Canada LLP

(57) ABSTRACT

There are described herein methods and systems for operating an electric motor of a watercraft. In one method, the electric motor of the watercraft is controlled based on commands received from an accelerator of the watercraft, a sensor signal is received from at least one sensor of the watercraft while the electric motor is in operation, the sensor signal indicative of an undesirable condition of a water intake of the watercraft, and a change is effected to the controlling of the electric motor in response to receiving the sensor signal.

21 Claims, 7 Drawing Sheets

(51) Int. Cl.
*B63H 21/21* (2006.01)
*H02P 23/24* (2016.01)

FIG. 2A

ELECTRIC MOTOR CONTROL BASED ON WATER INTAKE SENSOR

CROSS-REFERENCE TO RELATED APPLICATION(S)

This application claims priority from U.S. Provisional Patent Application No. 63/186,964, filed May 11, 2021, which is incorporated by reference in its entirety herein.

TECHNICAL FIELD

The present disclosure generally relates to the field of sports vehicles such as personal watercrafts, and, more particularly, to the field of electric personal watercraft.

BACKGROUND OF THE ART

Personal watercraft are recreational vehicles in which an onboard motor powers a water jet pump as its primary source of motive power. They may be designed for sitting, standing or kneeling and can be single or multi-passenger. When used recreationally or competitively, debris entering a water intake is problematic and can cause damage to the motor or driveline components. Furthermore, the water intake being outside the water when wave jumping can create significant ambient noise. While existing techniques for removing debris in the water intake and reducing noise during wave jumping are suitable for their purposes, improvements are desired.

SUMMARY

In accordance with one aspect, there is provided a method for operating an electric motor of a watercraft. The method comprises controlling the electric motor of the watercraft based on commands received from an accelerator of the watercraft; receiving a sensor signal from at least one sensor of the watercraft while the electric motor is in operation, the sensor signal indicative of an undesirable condition of a water intake of the watercraft; and effecting a change to the controlling of the electric motor of the watercraft in response to receiving the sensor signal.

In some embodiments, the sensor signal is indicative of an obstruction of the water intake of the watercraft.

In some embodiments, effecting the change to the controlling of the electric motor comprises reversing a direction of rotation of the electric motor to expel the obstruction from the water intake of the watercraft.

In some embodiments, the sensor signal is indicative of an increase in air or a decrease in water in the water intake of the watercraft.

In some embodiments, effecting the change to the controlling of the electric motor comprises shutting off the electric motor.

In some embodiments, the change to the controlling of the electric motor is performed for a temporary time period.

In some embodiments, the temporary time period is less than two tenths of a second.

In some embodiments, the temporary time period is fixed.

In some embodiments, the temporary time period varies as a function of at least one parameter.

In some embodiments, the at least one parameter is indicative of removal of the obstruction of the water intake pipe.

In some embodiments, the at least one parameter comprises at least one of a position of the watercraft with respect to a water level and an actual command from the input device of the watercraft.

In some embodiments, the temporary time period varies as a function of a design parameter of the electric motor related to a performance of the electric motor.

In some embodiments, the at least one sensor comprises at least one of a humidity sensor, an optical sensor, a positional sensor, a flowrate sensor, an optical sensor, and a pressure sensor.

In some embodiments, the method further comprises disabling the effecting of a change to the controlling of the electric motor in response to receiving the sensor signal when a disable signal is received.

In some embodiments, the disable signal is generated in response to a dedicated command from a user.

In some embodiments, the disable signal is generated automatically by a controller of the electric motor or the watercraft in response to a disable condition.

In accordance with another aspect, there is provided a method for operating an electric motor of a watercraft. The method comprises controlling the electric motor of the watercraft based on commands received from an accelerator of the watercraft; and in response to a motor reversal command, reversing a direction of rotation of the electric motor to expel an obstruction from a water intake of the watercraft, wherein reversing the direction of rotation of the electric motor causes a pump impeller of the watercraft to spin in an opposite direction.

In some embodiments, the motor reversal command is generated in response to a dedicated command from a user.

In some embodiments, the motor reversal command is generated in response to a sensor signal indicative of an obstruction in the water intake.

In some embodiments, the sensor signal indicative of the obstruction in the water intake is received from at least one sensor associated with the water intake of the watercraft.

In some embodiments, the sensor signal indicative of the obstruction in the water intake is received from at least one sensor associated with operational parameters of at least one of the watercraft and the electric motor.

In some embodiments, the sensor signal indicative of the obstruction in the water intake is derived from a plurality of operational parameters of at least one of the watercraft and the electric motor.

In some embodiments, reversing the direction of rotation of the electric motor is performed for a temporary time period that varies as a function of at least one parameter.

In some embodiments, reversing the direction of rotation of the electric motor is performed for a temporary time period of fixed duration.

In some embodiments, the temporary time period is less than two tenths of a second.

In some embodiments, the at least one parameter is indicative of removal of the obstruction of the water intake pipe.

In some embodiments, the at least one sensor comprises at least one of a flowrate sensor, an optical sensor, a pressure sensor, an engine speed sensor, an engine load sensor, a vehicle speed sensor, a gyroscope and an altimeter.

In accordance with yet another aspect, there is provided a method for operating an electric motor of a watercraft. The method comprises controlling the electric motor of the watercraft based on commands received from an accelerator of the watercraft; receiving a sensor signal indicative of a surfacing of a water intake of the watercraft from at least one sensor of the watercraft, while the electric motor is in operation; and shutting off the electric motor for a temporary time period in response to receiving the sensor signal.

In some embodiments, the temporary time period is fixed.

In some embodiments, the temporary time period varies as a function of at least one parameter.

In some embodiments, the at least one parameter comprises at least one of a position of the watercraft with respect to a water level and an actual command from the input device of the watercraft.

In some embodiments, the sensor signal indicative of the surfacing of the water intake is received from at least one sensor associated with the water intake of the watercraft.

In some embodiments, the sensor signal indicative of the surfacing of the water intake is received from at least one sensor associated with operational parameters of at least one of the watercraft and the electric motor.

In some embodiments, the sensor signal indicative of the surfacing of the water intake is derived from a plurality of operational parameters of at least one of the watercraft and the electric motor.

In some embodiments, the at least one parameter is a design parameter of the electric motor related to a performance of the electric motor.

In some embodiments, the at least one sensor comprises at least one of a humidity sensor, an optical sensor, and a positional sensor.

In some embodiments, the method further comprises disabling, in response to a disable signal, the shutting off of the electric motor of the watercraft in response to the sensor signal.

In accordance with an aspect, there is provided a system for operating an electric motor of a watercraft. The system comprises a processing unit and a non-transitory computer-readable medium having stored thereon program instructions. The program instructions are executable by the processing unit for performing any one of the methods described herein.

In accordance with another aspect, there is provided a watercraft comprising an electric motor, at least one sensor, and a controller coupled to the electric motor and the at least one sensor, the controller configured for operating the electric motor according to any one of the methods described herein.

In accordance with yet another aspect, there is provided a watercraft comprising an electric motor, a motor control switch on an input device of the watercraft, and a controller coupled to the electric motor and the motor control switch, the controller configured for controlling the electric motor according to some of the methods described herein.

Many further features and combinations thereof concerning embodiments described herein will appear to those skilled in the art following a reading of the instant disclosure.

DESCRIPTION OF THE FIGURES

In the figures,

FIG. 3 is an example of an input device of a personal watercraft;

DETAILED DESCRIPTION

Figure 1A:
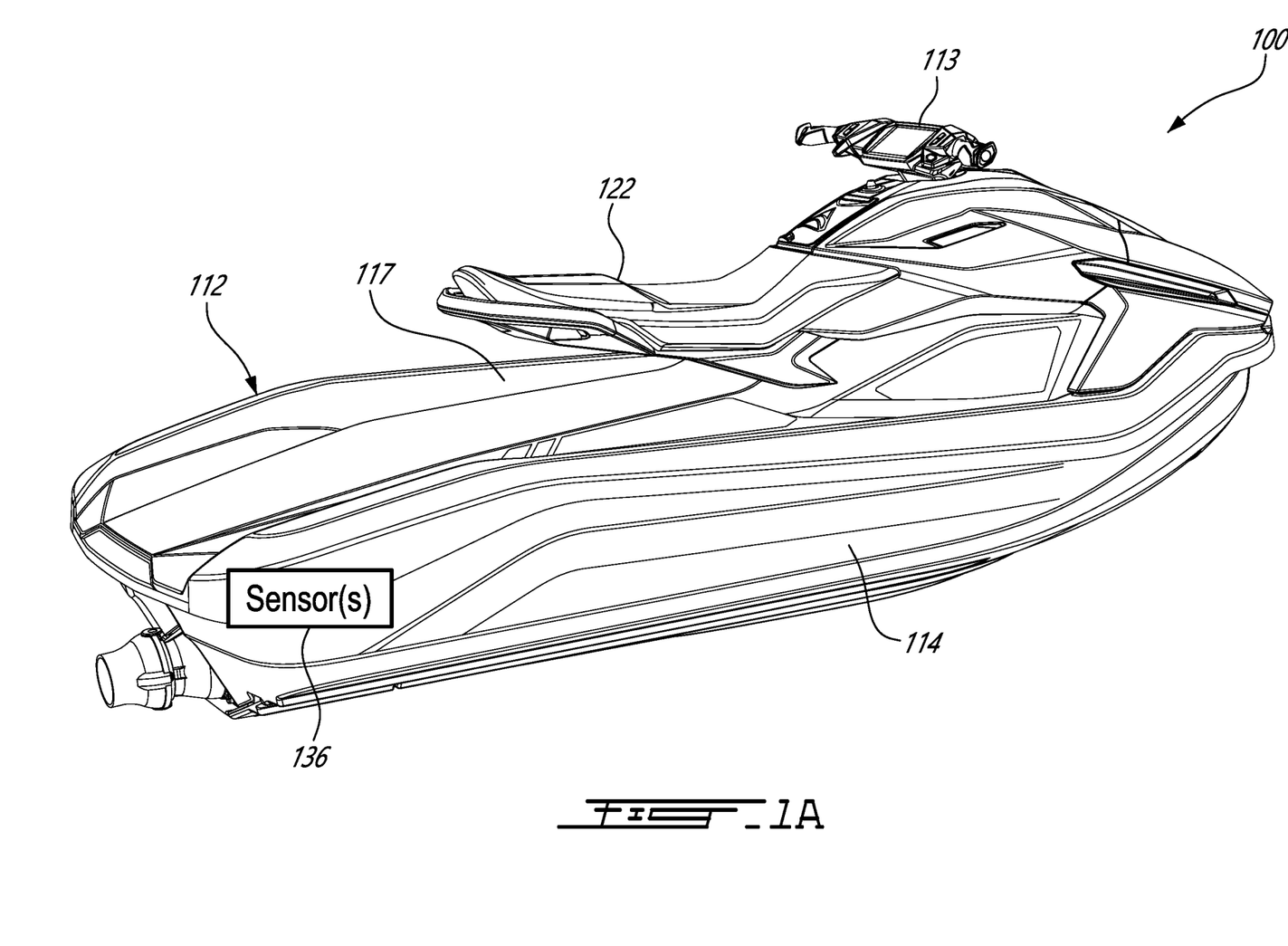
FIG. 1A is a three dimensional view of an example personal watercraft.
Figure 1B:
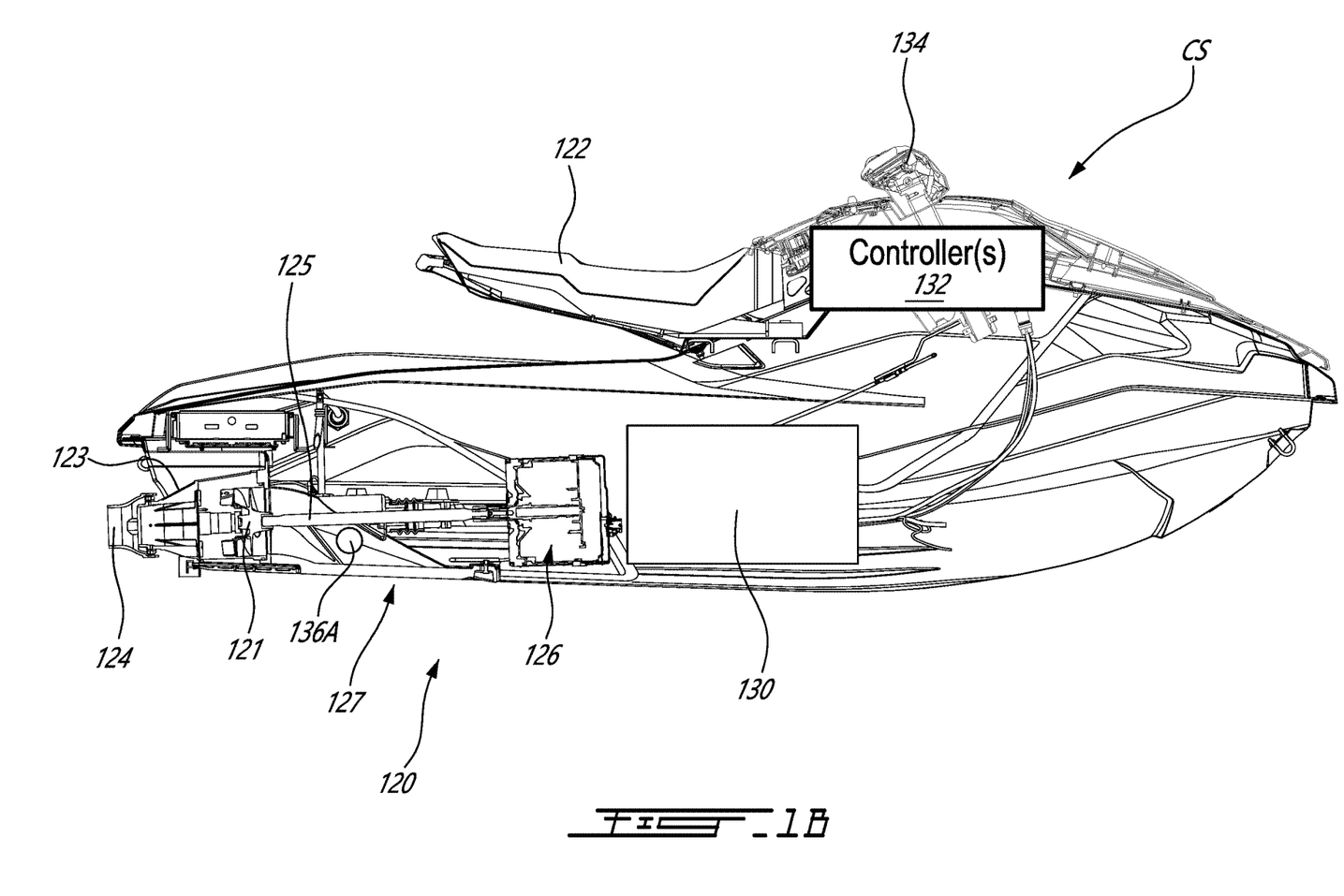
FIG. 1B is a cutaway view of the personal watercraft of FIG. 1A.

The present disclosure is directed to methods and systems for operating an electric motor of a watercraft. Referring to FIGS. 1A-1B, a watercraft of a type preferably provided for transporting one or more passengers thereon over a body of water is shown at 100. The watercraft is referred to herein as a "personal watercraft" or "PWC 100". The PWC 100 of FIGS. 1A-1B is electrically powered. An upper portion of the PWC 100 is formed of a deck 112 including a straddle seat 122 secured to the deck 112 and sized for accommodating a driver of the PWC 100 and optionally one or more passengers. A lower portion of the PWC 100 is formed of a hull 114 which sits in the water. The hull 114 may define foot wells 117 for the user of the PWC 100. The hull 114 and the deck 112 enclose an interior volume of the PWC 100 which provides buoyancy to the PWC 100 and houses components thereof. A non-limiting list of components of the PWC 100 that may be located in the interior volume include an electric motor 126 and one or more batteries 130 (referred hereinafter in the singular). In some embodiments, battery 130 may be a lithium ion or other type of battery. In various embodiments, motor 126 may be a permanent magnet synchronous motor or a brushless direct current motor for example. In the embodiment shown, the electric motor 126 has a maximum output power of between 120-180 horse power. In another embodiment, the electric motor 126 has a maximum output power greater than 180 horse power. The hull 114 may also include strakes and chines which provide, at least in part, riding and handling characteristics of the PWC 100. The interior volume may also include any other components suitable for use with PWC 100, such as storage compartments, for example.

The PWC 100 includes a jet propulsion system 120 to create a pressurized jet of water which provides thrust to propel the PWC 100 through the water. The jet propulsion system 120 includes an impeller 121 disposed in the water to draw water through a water intake 127 on an underside of the hull 114. Water ejected from the impeller 121 is directed through a venturi 123 which further accelerates the water to provide additional thrust. The accelerated water jet is ejected from the venturi 123 via a pivoting steering nozzle 124 which is directionally controlled by the driver with a steering device 113 to provide a directionally controlled jet of water to propel and steer the PWC 100.

The jet propulsion system 120 of the PWC 100 is driven by the electric motor 126. More specifically, the electric motor 126 is drivingly engaged to the impeller 121 via a drive shaft 125. The drive shaft 125 transfers motive power from the electric motor 126 to the impeller 121. The electric motor 126 may therefore be drivingly engaged to the impeller 121. In the embodiment shown, the electric motor 126 is in a direct-drive arrangement with the impeller 121, such that a connection between the electric motor 126 and the impeller 121 is free of a gearbox. In some embodiments, a transmission may be used to provide a speed ratio between the electric motor 126 and the impeller 121.

One or more controllers 132 (referred to hereinafter in the singular) and an accelerator 134 also referred to as "throttle", of the PWC 100 are part of a control system CS for controlling operation of the PWC 100. The controller 132 is operatively connected to the electric motor 126 and the accelerator 134 and is operable for modulating an electrical output transmitted from the battery 130 to the electric motor 126 as a function of commands received from the accelerator 134. Control of the electric motor 126 is effected through one or more inverter 145 (shown in FIGS. 2A-2B). The controller 132 is operable for controlling a rotational speed, and a thrust, of the impeller 121. The accelerator 134 may be located on the steering device 113 or at other suitable locations as will be described below.

One or more sensors 136 are provided as part of the PWC 100. At least one of the sensors 136 is used to determine an undesirable condition of the water intake 127 of the PWC 100. Such a sensor is referred to herein generally as an intake sensor 136A, and may be composed of a single sensor or a combination of sensors, including any of those illustrated in FIG. 2B. The intake sensor 136A can be found inside the water intake 127 or elsewhere in the PWC 100. The controller 132 is operatively coupled to the intake sensor 136A and configured to effect a change to the controlling of the electric motor 126 of the PWC 100 in response to receiving at least one sensor signal indicative of the undesirable condition of the water intake 127.

In some embodiments, the undesirable condition of the water intake 127 is a partial or whole obstruction thereof, for example due to the presence of debris or unwanted material therein which may take the form of sand, seaweed, plastic bags, and any other substance that may inadvertently enter the water intake 127. In this case, the sensor signal as emitted by the intake sensor 136A and received by the controller 132 is indicative of an obstruction of the water intake 127 of the PWC 100. The change in control to the electric motor 126 effected by the controller 132 comprises reversing a direction of rotation of the electric motor 126 in order to expel the obstruction from the water intake 127 of the PWC 100. In one embodiment, the rotation of the electric motor 126 is reversed for a temporary time period.

Figure 2A:
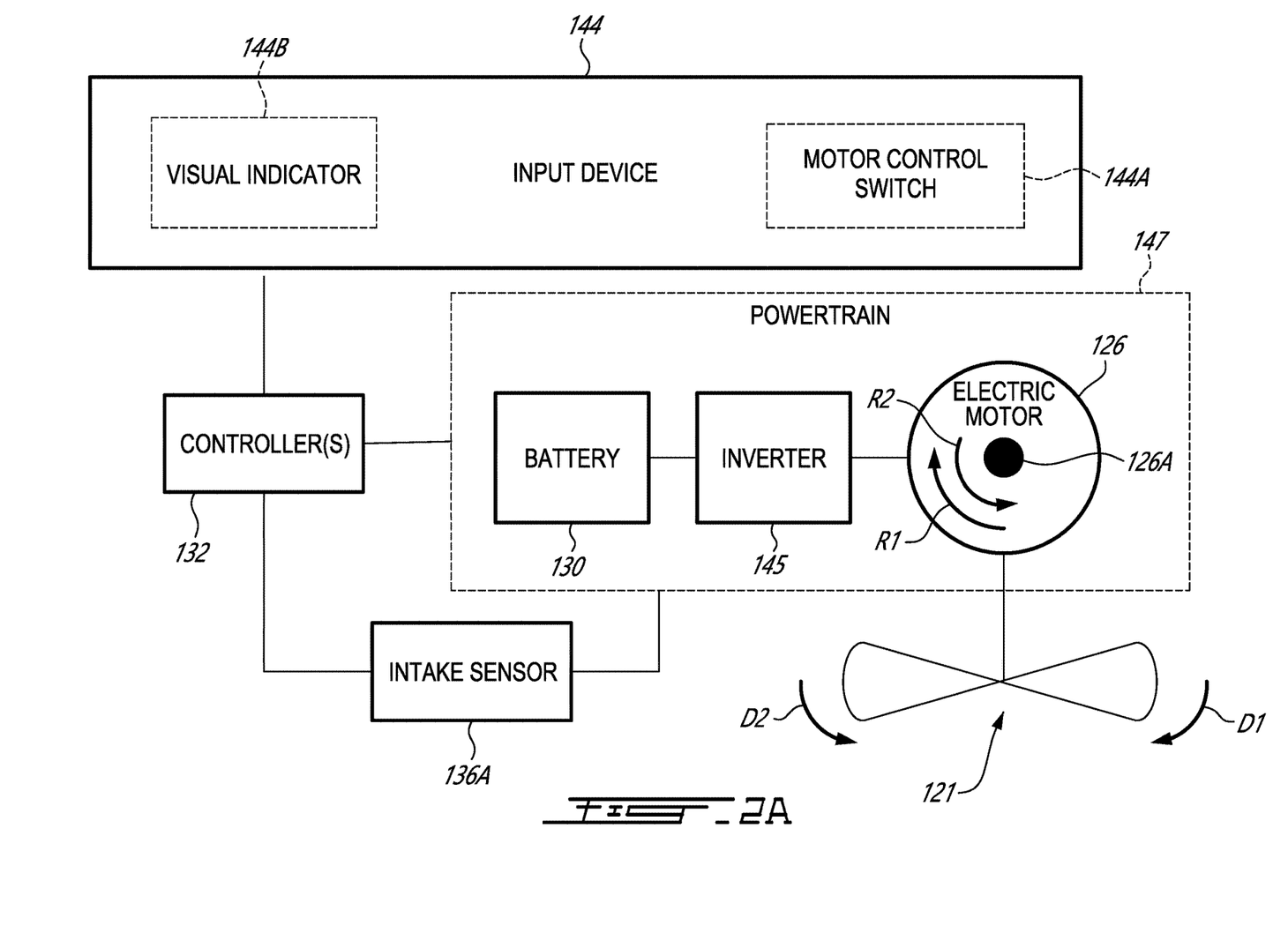
FIGS. 2A-2B are schematic diagrams illustrating exemplary control of the electric motor of a personal watercraft.
Figure 2B:
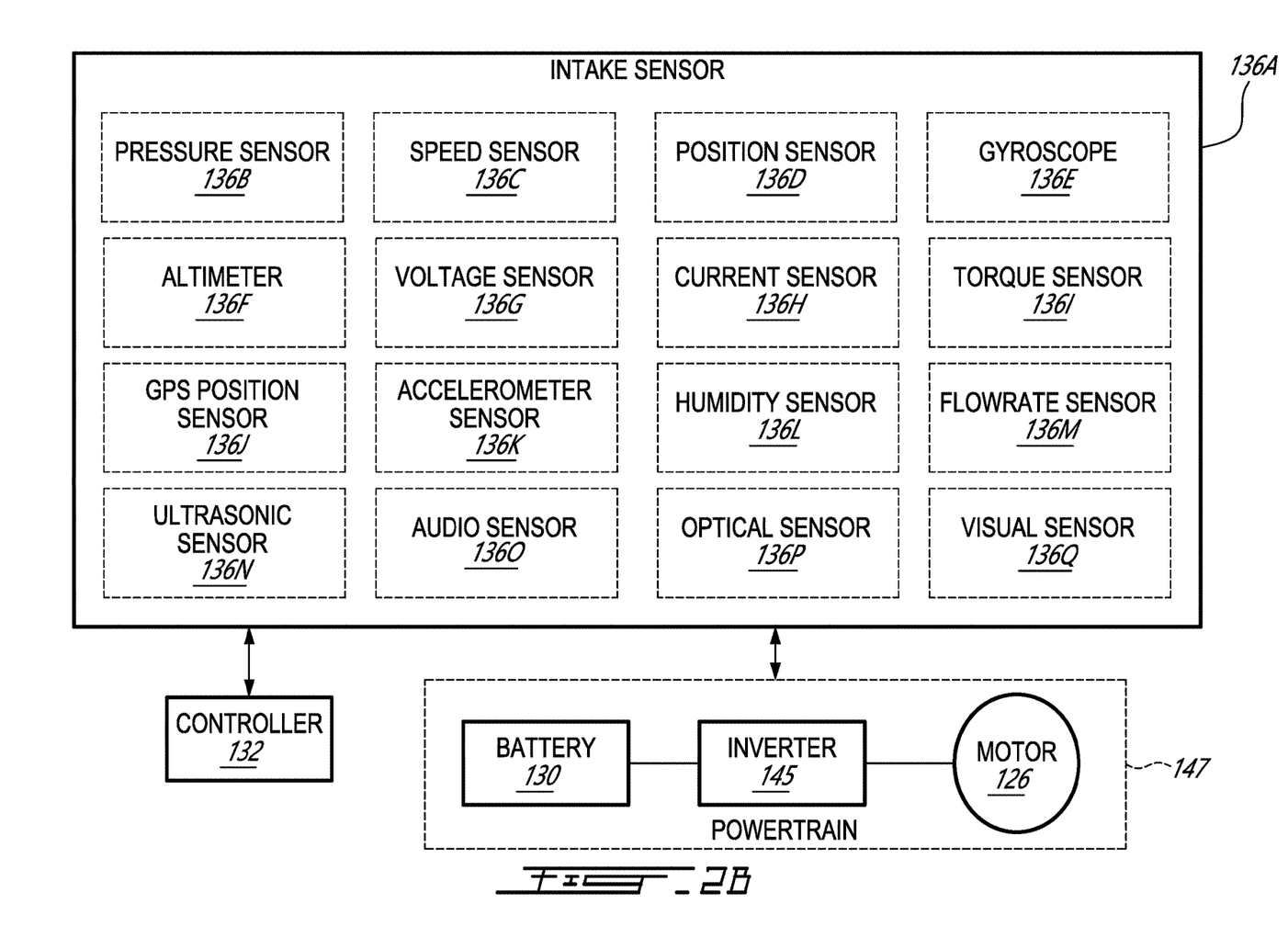

With additional reference to FIGS. 2A-2B, the electric motor 126 has a forward configuration in which a motor output 126A (e.g. a rotor) of the electric motor 126 rotates in a first direction R1. The electric motor 126 has a rearward configuration in which the motor output 126A of the electric motor 126 rotates in a second direction R2 opposite the first direction R1. The controller 132 is configured to operate the electric motor 126 in a selected one of the forward configuration and the rearward configuration. In the forward configuration, the motor output 126A of the electric motor 126 engages the impeller 121 in such a way that the impeller 121 rotates in a first direction D1, causing water to be drawn into the water intake 127 and the PWC 100 to be propulsed in a forward direction. In the rearward configuration, the motor output 126A of the electric motor 126 engages the impeller 121 in such a way that the impeller 121 rotates in a reverse direction D2 opposite the forward direction D1. When the impeller 121 rotates in the reverse direction D2, water inside the water intake 127, and thus debris in the water intake 127 is expelled therefrom, instead of being drawn in.

The intake sensor 136A for sensing the obstruction in the water intake 127 may be operatively connected to component(s) of a powertrain 147 of the PWC 100 and to the controller 132. The powertrain 147 may include the battery 130, one or more power inverters 147 (referred to hereinafter in the singular) and the electric motor 126. The intake sensor 136A may be configured to sense one or more operating parameters of the powertrain 147 for use by the controller 132 for detecting the obstruction of the water intake 127. For example, parameters of the powertrain 147 may include data indicative of an amount of electric power being supplied to the electric motor 126 and these parameters may be acquired via one or more current sensor 136H and/or one or more voltage sensor 136G operatively connected to the battery 130 and the controller 132, or to the inverter 145 and the controller 132. The current sensor 136H may be operatively disposed between the battery 130 and the inverter 145 to measure DC current values representative of the real power supplied to the electric motor 126. The voltage sensor 136G may be operatively disposed between the battery 130 and the inverter 145 to measure voltage values representative of the real power supplied to the electric motor 126. In another example, parameters of the powertrain 147 may include data indicative of an operating speed and/or angular position of the motor output 126A of the electric motor 126. The operating speed of the electric motor 126 may be acquired via speed/position sensor(s) 136C/136D operatively connected to the electric motor 126 and the controller 132. Speed/position sensor(s) 136C/136D may include any suitable instrument such as a rotary encoder and/or tachometer suitable for measuring the angular position of the motor output 126A of the electric motor 126 and/or the rotation speed (e.g., revolutions per minute) of the motor output 126A of the electric motor 126 and/or of drive shaft 125. In yet another example, parameters of the powertrain 147 may include data indicative of an output torque of the electric motor 126. The output torque of the electric motor 126 may be measured directly via a torque sensor 136I or may be inferred based on the amount of electric power being supplied to the electric motor 126, for example. In some embodiments, the torque sensor 136I may include a rotary (i.e., dynamic) torque transducer suitable for measuring torque on a rotating shaft.

The intake sensor 136A may comprise one or more of a flowrate sensor 136M, a visual sensor (i.e. a camera) 136Q, an optical sensor 136P, a humidity sensor 136L, an ultrasonic sensor 136N, an audio sensor and a pressure sensor 136B, among other possibilities. Indeed, any sensor which may provide a reading indicative of a blockage or obstruction in the water intake 127 may be used. For example, the flowrate sensor 136M may detect changes in flow of air or water, the pressure sensor 136B may detect changes in air pressure or water pressure, the visual sensor 136Q or optical sensor 136P may detect changes in color or opacity inside the water intake 127, the ultrasonic sensor 136N may detect changes in the travel time of sound waves in the water intake 127, the audio sensor 136O may be detect changes in sound. Other sensors capable of detecting changes in parameters associated with the water intake 127, the power train 147, and/or the PWC 100 may be used. It will be understood that the intake sensor 136A does not have to be inside the water intake 127 to detect the obstruction in the water intake 127, and can have more than one purpose.

In some embodiments, the intake sensor 136A is composed of one or more sensors already present on the PWC 100. In addition, the controller 132 may rely on sensor fusion (i.e. a combination of sensor readings) to detect an obstruction in the water intake 127. For example, a combination of engine load as measured by a current sensor 136H and/or a voltage sensor 136G and vehicle speed/acceleration or engine speed as measured by a speed sensor 136C and/or accelerometer 136K may be used, such that an abnormal engine load for a corresponding engine speed or vehicle speed may be determined by the controller 132 to be a condition indicative of an obstruction or blockage within the water intake 127. A combination of a position of the accelerator 134 as measured by the position sensor 136D and a torque of the electric motor 126 as measured by the torque sensor 136I may be used, such that an abnormal torque of the electric motor 126 for a corresponding position of the accelerator 134 may be determined by the controller 132 to be a condition indicative of an obstruction or blockage of the water intake 127. A combination of a sound emitted by the PWC 100 as measured by an audio sensor 136O and a pressure in the water intake 127 as measured by the pressure sensor 136B or a flowrate in the water intake 127 as measured by the flowrate sensor 136M may be used, such that an abnormal sound for a corresponding pressure or flowrate of the water intake 127 may be determined by the controller to be a condition indicative of an obstruction or blockage of the water intake 127. Various other combinations are also contemplated.

As described above, upon detection of an obstruction of the water intake 127 the controller 132 may cause reversal of the electric motor 126 for a temporary time period. Contrary to combustion engines, electric motors may start, stop, and/or reverse speed very quickly and can be precisely controlled. In addition, starting and stopping of an electric motor has a low impact on the wear and tear of the motor due to the low number of components making up the electric motor and the absence of many of the moving parts of the combustion engine. The fast reaction time of electric motors allows the temporary reversal of the electric motor 126 to have a negligible effect on the user experience. In some cases, the manoeuvre may not be felt or noticed by the rider of the PWC 100. Electric motors have the ability to produce high torque from the get-go and do not need a build-up in speed, making them well suited for the purposes described herein. The temporary time period may be fixed or vary. A fixed temporary time period may be, for example, less than two tenths of a second. In some embodiments, a single fixed temporary time period is provided. Alternatively, a plurality of fixed time periods may be available, and a selection therefrom may be made by the controller 132 based on one or more parameters. For example, the duration may depend on a speed at which the PWC 100 is traveling or a speed of rotation of the electric motor 126, whereby the greater the speed, the shorter the duration of time during which the direction of the electric motor 126 is reversed. Other electric motor parameters, such as actual power level, may also be used. In another example, the size or other design specification of the electric motor 126 may be used to determine the duration of the temporary time period during which the direction of the electric motor 126 is reversed.

In some embodiments, the temporary time period is not fixed and varies as a function of one or more parameters, such as motor rotational speed, traveling speed, motor size, or other engine design specification. The controller 132 may be configured to determine the duration dynamically and return the electric motor 126 to its forward configuration accordingly. In some embodiments, the controller 132 is configured to maintain the rearward configuration of the electric motor 126 until the obstruction is removed. Removal of the obstruction may be determined based on one or more sensor readings, which may come from the intake sensor 136A and/or from any other of the sensors 136 of the PWC 100. In some embodiments, a combination of sensor readings and other parameters are used to dynamically determine the duration of the temporary time period. It will be understood that once the temporary time period is completed, the electric motor 126 is controlled in the forward configuration and control is returned to the user. In some embodiments, the electric motor 126 is returned to the original power level at which it was operating prior to the change to the control of the electric motor 126 causing it to operate in the rearward configuration. In some embodiments, an actual position of the accelerator 134, and/or brake is used to determine the power level to which the electric motor is to be set once the temporary time period is completed. The ramp-up of the power level may be performed using any acceleration scheme, depending on practical implementation.

The controller 132 is configured to generate a motor reversal command in order to engage the electric motor 126 in the rearward configuration in which the motor output 126A of the electric motor 126 rotates in the second direction R2 and engages the impeller 121 to rotate in the reverse direction D2. As described hereinabove, the motor reversal command may be generated in response to the sensor signal from the intake sensor 136A, and/or one or more other sensors. In some embodiments, the motor reversal command is generated in response to a dedicated command from a user, for example through an input device 144 of the PWC 100. The dedicated command from a user through input device 144 may be received while the motor output 126A of the electric motor 126 is rotating in a forward direction R1. Alternatively, the dedicated command from input device 144 may be received when the electric motor 126 is in an "idle" condition, meaning that the motor output 126A of the electric motor 126 is not rotating. For example, a user may activate input device 144 when the PWC 100 is stopped. In one exemplary embodiment, a motor control switch 144A is provided, in addition to the accelerator 134. The motor control switch 144A may take various forms, such as a button, a handle, a lever, a key, a dial, a joystick, and the like. The motor control switch 144A may also be provided through a touch screen, as shown in the example of FIG. 3. Activation of the motor control switch 144A causes the controller 132 to generate the motor reversal command and engage the electric motor 126A in the rearward configuration, in which the motor output 126A of the electric motor 126 rotates in the second direction R2, and engages the impeller 121 to rotate in the reverse direction D2. In some embodiments, the controller 132 is configured to actuate a visual indicator 144B when an obstruction is detected in the water intake 127, and the user can opt to activate the motor control switch 144A to remove the obstruction through a reversal of the electric motor rotational direction and by extension, a reversal of the impeller rotational direction. An example of a visual indicator 144B is illustrated in FIG. 3 and embodied as a text warning that scrolls or is displayed at the top of a touch screen of the input device 144. Other embodiments for the visual indicator 144B including a light, the presence or illumination of an icon, or other indicators will be readily understood by those skilled in the art.

In some embodiments, the undesired condition of the water intake 127 is that the water intake 127 is no longer submerged in water. This may occur, for example, when the PWC 100 is jumping due to a manoeuvre from the user or particularly choppy waters, causing the PWC 100 to frequently and excessively jump above the water surface (i.e. wave jumping). This condition is referred to herein as a surfaced water intake 127 or water intake surfacing, and may be detected when the sensor signal as emitted by the intake sensor 136A and received by the controller 132 is indicative, for example, of a decrease in water or an increase in air in the water intake 127 of the PWC 100. In some embodiments, the decrease in water or increase in air is combined with a timing parameter in order to confirm the condition. The change in control to the electric motor 126 effected by the controller 132 when water intake surfacing is detected comprises shutting off the electric motor 126. The controller 132 may shut off the electric motor 126 for a temporary time period. When the water intake 127 surfaces, the water level in the water intake 127 decreases. Without water in the water intake 127 during water intake surfacing, there is nothing to muffle the sound of rotation of the impeller 121, which can be loud and unpleasant for the rider and people nearby. In addition, less water in the water intake 127 may result in less resistance to the motor, which may lead to increased acceleration of the motor, which can also cause loud and undesired noise. The temporary shutoff of the motor thus serves to reduce the noise caused by the surfacing of the water intake 127.

The intake sensor 136A for sensing a surfaced water intake 127 may comprise one or more of a flowrate sensor 136M (for air or water), a visual sensor 136Q, an optical sensor 136P, a pressure sensor 136B, a humidity sensor 136I, an ultrasound sensor 136N, an audio sensor 136O, and any type of positional or inertial sensor, such as but not limited to a gyroscope 136E, an altimeter 136F, and a GPS sensor 136J. For example, an altitude of the PWC 100 with respect to the ground as measured by the altimeter 136F may be indicative of a jumping manoeuvre, which would necessarily cause the water intake 127 to surface. The flowrate sensor 136M may detect changes in flow of air or water, the pressure sensor 136B may detect changes in air pressure or water pressure, the visual sensor 136Q or optical sensor 136P may detect changes in color or opacity inside the water intake 127, the ultrasonic sensor 136N may detect changes in the travel time of sound waves in the water intake 127, the audio sensor 136O may be detect changes in sound. Other sensors capable of detecting changes in parameters associated with the water intake 127, the power train 147, and/or the PWC 100 may be used. It will be understood that the intake sensor 136A may be positioned within or in proximity to the water intake 127. In other embodiments, the water intake sensor 136A does not have to be inside the water intake 127 to detect the surfacing of the water intake 127, and can have more than one purpose.

In some embodiments, the intake sensor 136A may be composed of one or more sensors already present on the PWC 100 in order to detect the surfacing of the water intake 127, including any of those illustrated in FIG. 2B. In addition, the controller 132 may rely on sensor fusion to detect a surfacing of the water intake 127. For example, a combination of engine load as measured by a current sensor 136H and/or a voltage sensor 136G and/or a rotational speed of the electric motor 126 as measured by the speed sensor 136C may be used, such that a given engine load for a corresponding motor RPM is indicative of a surfacing of the water intake 127. A combination of a position of the accelerator 134 as measured by the position sensor 136D and an angular velocity of the PWC 100 as measured by the gyroscope 136E may be used, such that a given accelerator position for a corresponding angular velocity of the PWC 100 is indicative of a surfacing of the water intake 127. Various other combinations are also contemplated.

The duration of temporary time period during which the electric motor 126 is shutoff may be fixed or vary. As stated above, the electric motor is particularly well suited for a rapid off-on sequence having little to no impact on user experience. A fixed temporary time period may be, for example, less than two tenths of a second. In some embodiments, a single fixed temporary time period is provided. Alternatively, a plurality of fixed time periods may be available, and a selection therefrom may be made by the controller 132 based on one or more parameters. For example, the duration may depend on a height at which the PWC 100 is jumping. The speed of rotation of the electric motor 126 may also be used as a parameter. Other electric motor parameters, such as actual power level, may also be used. In another example, the size or other design specification of the electric motor 126 may be used to determine the duration of the temporary time period during which the electric motor 126 is shutoff.

In some embodiments, the temporary time period is not fixed and varies as a function of one or more parameters, such as motor rotational speed, jumping height, vehicle speed, motor size, or other engine design specification. Commands from the accelerator 134 of the PWC 100 may also be used. The controller 132 may be configured to determine the duration dynamically and turn the electric motor 126 back on accordingly. In some embodiments, one or more sensor reading is used to determine when to turn the electric motor 126 back on. The sensor reading may come from the intake sensor 136A or from any other of the sensors 136 on the PWC 100. For example, acceleration, position, pressure, altitude, and the like may be used to determine the duration of the temporary time period dynamically. In some embodiments, a combination of sensor readings and other parameters, including commands from the accelerator 134 and/or brake, are used to dynamically determine the duration of the temporary time period.

There may be a trade-off in performance vs sound reduction when determining the temporary time period during which the electric motor 126 is shutoff when a surfacing of the water intake 127 is detected. For example, if a better performance is desired, the electric motor 126 may be turned back on prior to or concurrently with re-submerging of the water intake 127 into the water. In contrast, if an optimal sound reduction is desired, the electric motor 126 may be turned back on only after the re-submerging of the water intake 127 into the water. There may be a setting on the PWC 100 to allow the user to operate the PWC 100 in an "optimal sound" mode or in an "optimal performance" mode.

It will be understood that once the temporary time period is completed, the electric motor 126 is controlled in the forward configuration and control is returned to the user. In some embodiments, the electric motor 126 is returned to the original power level at which it was operating prior to the change to the control of the electric motor 126 causing it to be temporarily shutoff. In some embodiments, an actual position of the accelerator 134 is used to determined the power level to which the electric motor 126 is to be set once electric motor 126 is turned back on. The ramp-up of the power level may be performed using any acceleration scheme, depending on practical implementation.

Figure 4:
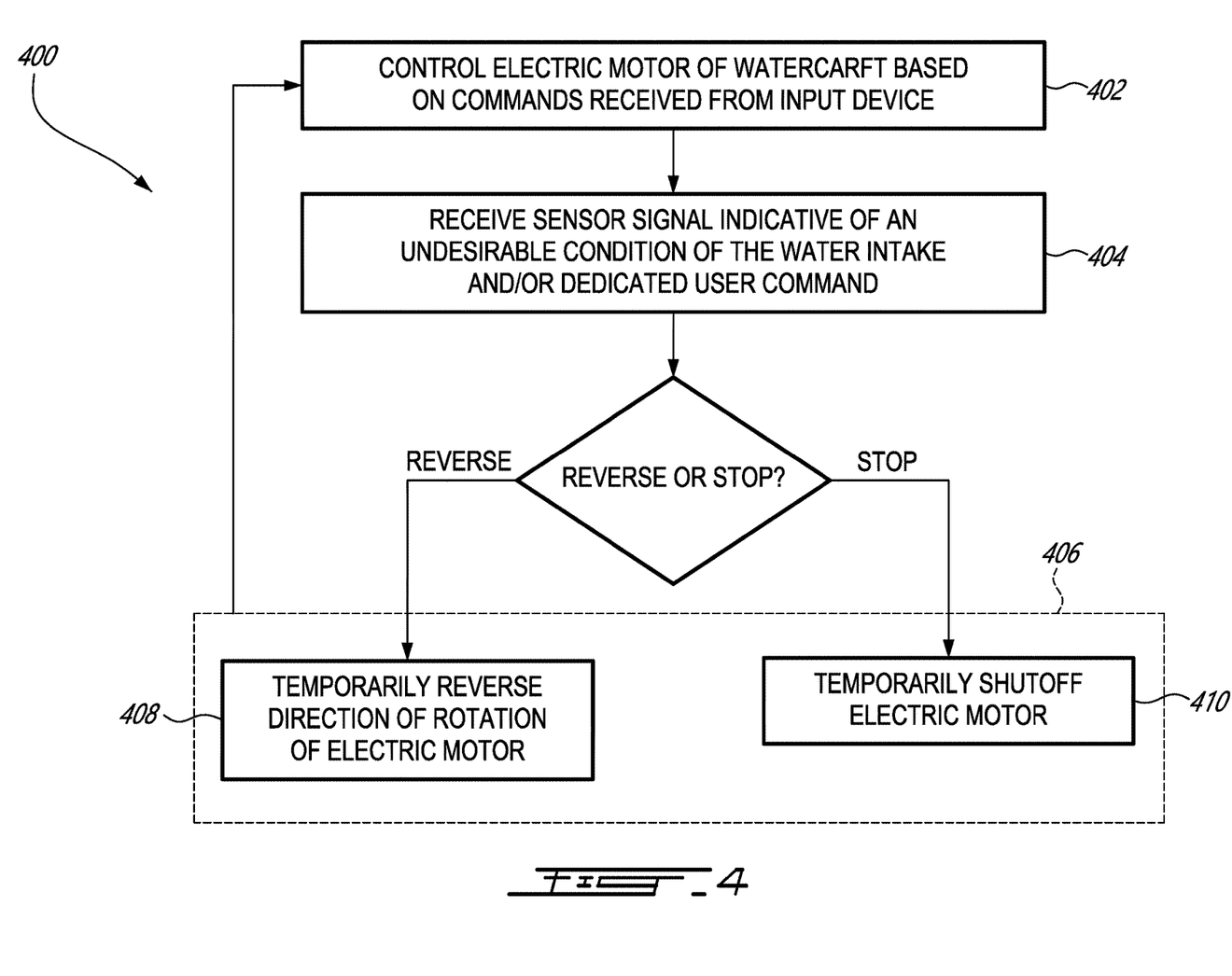
FIG. 4 is a flowchart of an example method for operating an electric motor of a personal watercraft.

The controller 132 may be configured to operate the electric motor 126 of the PWC 100 in response to the detected undesirable condition of the water intake 127, i.e. of a water intake obstruction and/or a water intake surfacing. With reference to FIG. 4, there is illustrated an example method 400 for operating an electric motor of a watercraft, such as the PWC 100. At 402, the electric motor 126 is controlled based on commands received from the accelerator 134 (or a cruise control function) of the PWC 100. At 404, one or more sensor signal is received from at least one sensor of the PWC 100, i.e. the water intake sensor 136A, while the motor is in operation. The sensor signal is indicative of the undesirable condition of the water intake 127 of the PWC 100. Alternatively or in combination therewith, a dedicated user command may be received at 304. The dedicated user command may be received, for example, through the motor control switch 144A of the input device 144. At 406, a change is effected to the controlling of the electric motor 126 of the PWC 100 in response to the received sensor signal(s) and/or the dedicated user command.

In some embodiments, the sensor signal is indicative of a surfacing of the water intake 127 of the PWC 100 and the electric motor 126 is temporarily shutoff, as per 410, in order to reduce the noise caused by the surfacing of the impeller 121. In some embodiments, the sensor signal is indicative of a surfacing of the water intake 127 of the PWC 100 and the direction of rotation of the electric motor 126 is temporarily reversed, as per 408, in order to reduce noise caused by the surfacing of the impeller 121. Indeed, reversing of the motor direction may have the same effective result as shutting off the electric motor 126 in terms of noise reduction, as it requires a deceleration of the rotation of the motor output 126A and thus a reduction in noise caused by the electric motor 126. Therefore, the dedicated user command may result in a temporary reversal of the electric motor 126 or a temporary shutoff of the electric motor 126.

In some embodiments, the sensor signal is indicative of an obstruction of the water intake 127 of the PWC 100 and the direction of rotation of the electric motor 126 is temporarily reversed, as per 408, in order to expel the obstruction from the water intake 127. In some embodiments, the sensor signal is indicative of an obstruction of the water intake 127 of the PWC 100 and electric motor 126 is temporarily shutoff, as per 410, when the obstruction is detected. For example, if reversal of the motor direction has already been tried unsuccessfully, it may be preferable to shutoff the electric motor to allow the user to manually remove the obstruction. A timing parameter may be used in this scenario, whereby if a previous reversal has been effected less than a certain amount of time prior, a shutdown is performed instead of a reversal. Two or more consecutive unsuccessful attempts to expel the obstruction through a reversal of the direction of rotation of the electric motor 126 may also result in a temporary shutdown.

In some embodiments, the water intake obstruction may be quantified in accordance with a degree of obstruction, which may be used to determine whether to reverse the direction of the motor, as per 408, or shutoff the motor, as per 410. A lower degree of obstruction may result in a motor reversal while a higher degree of obstruction may result in a motor shutoff. For example, if water flowrate in the water intake 127 is used as a measure of obstruction, ranges of water flowrate may be associated with various degrees of obstruction, where a lower water flowrate is indicative of a greater degree of obstruction and a higher flowrate is indicative of a lower degree of obstruction. Other embodiments are also contemplated. When the electric motor 126 is temporarily shutdown to allow the user to manually remove the obstruction, the electric motor may be turned back on upon receipt of a command from the accelerator 134, for safety purposes. The visual indicator 144B (FIGS. 2A, 3) may also be used to indicate the purpose of the temporary shutdown of the motor.

The motor control switch 144A may be configured to generate a user command for temporarily reversing the direction of rotation of the electric motor 126 or temporarily shutting off the electric motor 126, for the purpose of removing the obstruction. The motor control switch 144A may be configured to generate a user command for temporarily reversing the direction of rotation of the electric motor 126 or temporarily shutting off the electric motor 126, for the purpose of reducing motor noise during wave jumping.

In some embodiments, the motor control switch 144A may be configured to act as a dedicated request to activate the motor control based on sensor readings of the intake sensor 136A, such that the function is enabled when the motor control switch 144A is activated and otherwise disabled. Other parameters may be used to enable and/or disable the function. For example the function is enabled if the PWC 100 is traveling below a speed threshold as measured by the speed sensor 136C and disabled if the PWC 100 is traveling above the speed threshold as measured by the speed sensor 136C. In some embodiments, sensor fusion is used to enable and/or disable the function. For example, a combination of torque on the electric motor 126 as measured by the torque sensor 136I and a rotational speed of the electric motor 126 as measured by the speed sensor 136C may be used, such that the function is disabled for a given engine torque and a corresponding motor RPM. A combination of a position of the accelerator 134 as measured by the position sensor 136D and engine load as measured by a current sensor 136H and/or a voltage sensor 136G may be used, such that the function is disabled for a given accelerator position and a corresponding engine load.

In some embodiments, the function is enabled based on a set of operating conditions of the electric motor 126 and/or the PWC 100 that are suitable for the function. In some embodiments, the function is disabled based on a set of operation conditions of the electric motor 126 and/or the PWC 100 that are unsuitable for the function. In some embodiments, the controller 132 is configured for enabling and/or disabling detecting of a water intake obstruction and detecting of a water intake surfacing independently, manually and/or automatically. In some embodiments, the two types of detections are enabled and/or disabled together manually and/or automatically.

In some embodiments, a same intake sensor 136A is used for detecting obstructions in the water intake 127 and detecting water intake surfacing. In some embodiments, each detection is performed using one or more dedicated intake sensor 136A, of a same or different type, as described hereinabove.

Figure 5:
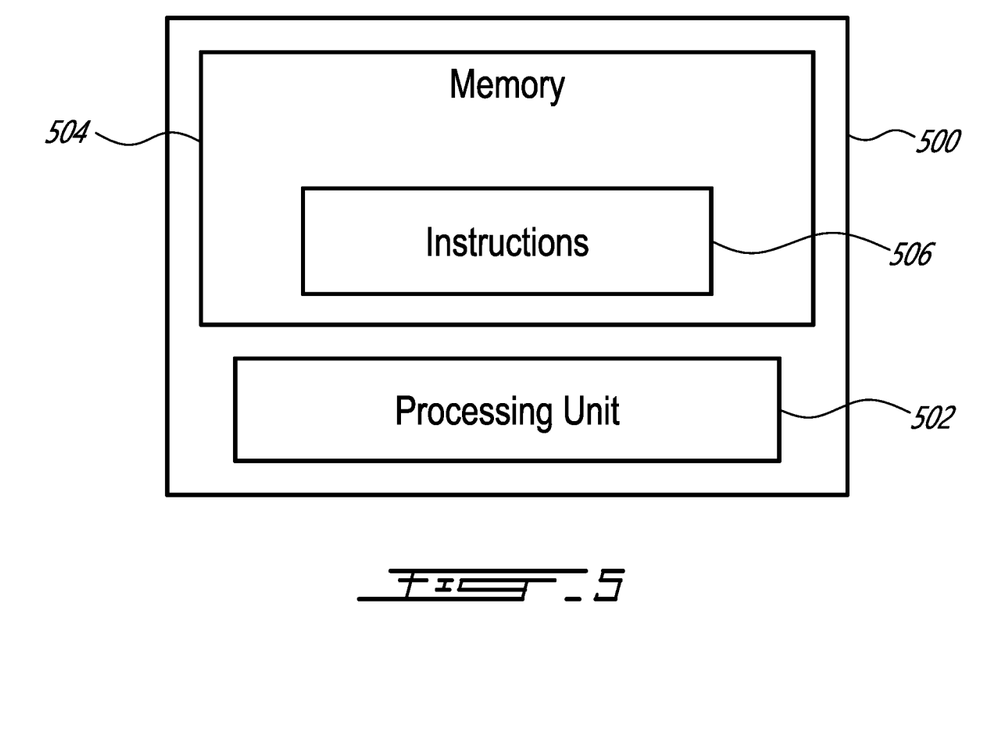
FIG. 5 is a block diagram of an example computing device.
Figure 9:
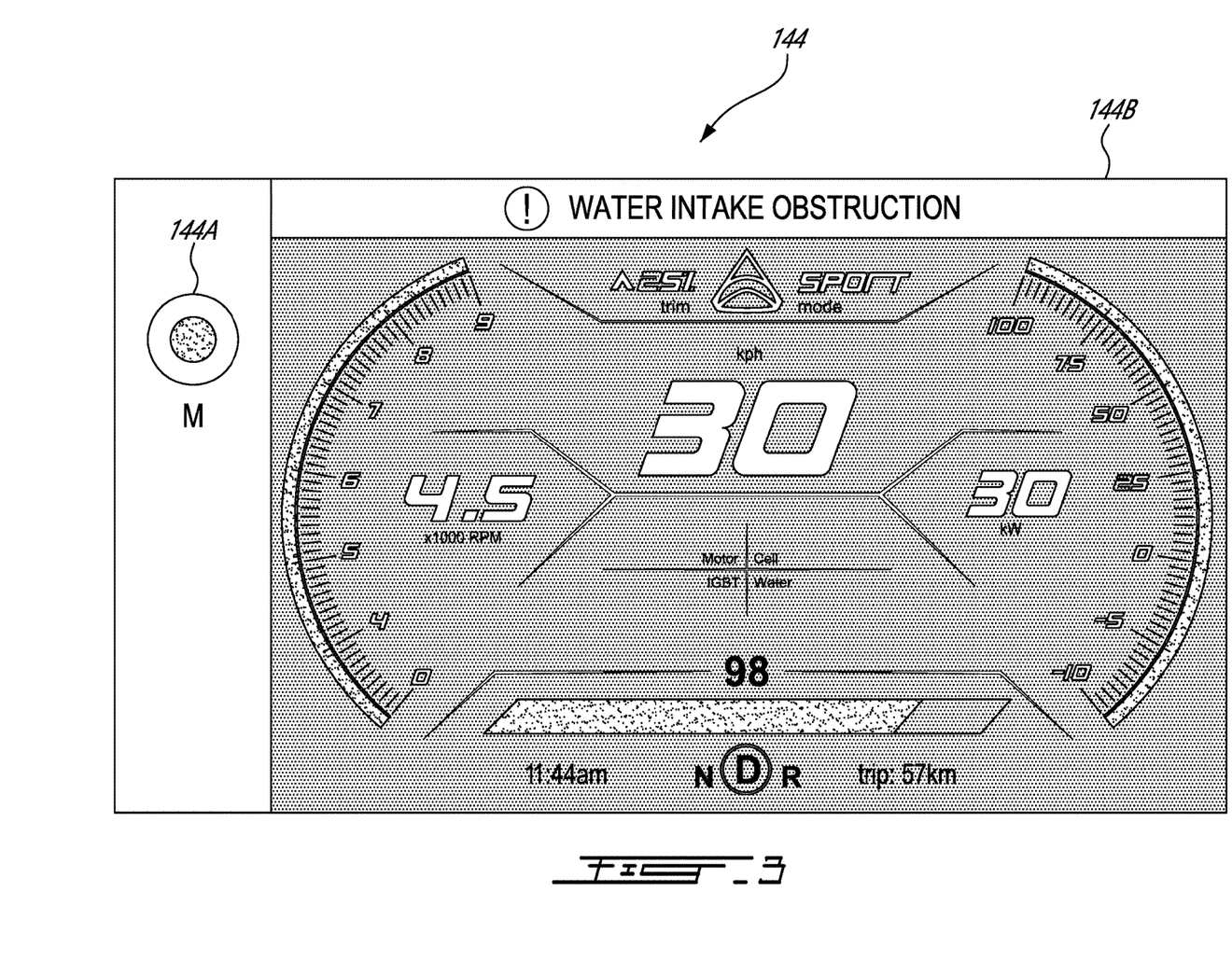

Referring now to FIG. 5, an example embodiment for the controller 132 of the PWC 100 is shown in detail. As illustrated, the controller 132 is embodied as a computing device 500. Although only one computing device 500 is shown for simplicity, multiple computing devices 500 operable to exchange data may be employed, as appropriate. The computing devices 500 may be the same or different types of devices. The computing device 500 comprises a processing unit 502 and a memory 504 having stored therein computer-executable instructions 506. The processing unit 502 may comprise any suitable devices configured to implement the functionality described herein, including the various methods described herein, such that instructions 506, when executed by the computing device 500 or other programmable apparatus, may cause the functions/acts/steps described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to the computing device 500, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 406 executable by processing unit 502.

The methods and systems of the present disclosure may be implemented in a high level procedural or object oriented programming or scripting language, or a combination thereof, to communicate with or assist in the operation of a computer system, for example the controller 132. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and pre-defined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

As can be seen therefore, the examples described above and illustrated are intended to be exemplary only. The scope is indicated by the appended claims.

The invention claimed is:

1. A method for operating an electric motor of a watercraft, the method comprising:
controlling the electric motor of the watercraft based on commands received from an accelerator of the watercraft;
receiving a sensor signal from at least one sensor of the watercraft while the electric motor is in operation, the sensor signal indicative of an undesirable condition of a water intake of the watercraft; and
effecting a change to the controlling of the electric motor of the watercraft in response to receiving the sensor signal.

2. The method of claim 1, wherein the sensor signal is indicative of an obstruction of the water intake of the watercraft.

3. The method of claim 2, wherein effecting the change to the controlling of the electric motor comprises reversing a direction of rotation of the electric motor to expel the obstruction from the water intake of the watercraft.

4. The method of claim 1, wherein the sensor signal is indicative of an increase in air or a decrease in water in the water intake of the watercraft.

5. The method of claim 4, wherein effecting the change to the controlling of the electric motor comprises shutting off the electric motor.

6. The method of claim 1, wherein the change to the controlling of the electric motor is performed for a temporary time period.

7. The method of claim 6, wherein the temporary time period is less than two tenths of a second.

8. The method of claim 6, wherein the temporary time period is fixed.

9. The method of claim 6, wherein the temporary time period varies as a function of at least one parameter.

10. The method of claim 9, wherein the at least one parameter is indicative of removal of an obstruction of the water intake pipe.

11. The method of claim 9, wherein the at least one parameter comprises at least one of a position of the watercraft with respect to a water level and an actual command from the accelerator of the watercraft.

12. The method of claim 6, wherein the temporary time period varies as a function of a design parameter of the electric motor related to a performance of the electric motor.

13. The method of claim 1, wherein the at least one sensor comprises at least one of a humidity sensor, an optical sensor, a positional sensor, a flowrate sensor, an optical sensor, and a pressure sensor.

14. The method of claim 1, further comprising disabling the effecting of a change to the controlling of the electric motor in response to receiving the sensor signal when a disable signal is received.

15. The method of claim 14, wherein the disable signal is generated in response to a dedicated command from a user.

16. The method of claim 14, wherein the disable signal is generated automatically by a controller of the electric motor or the watercraft in response to a disable condition.

17. A watercraft comprising:
   an electric motor;
   at least one sensor; and
   a controller coupled to the electric motor and the at least one sensor and configured for operating the electric motor according to the method of claim 1.

18. A method for operating an electric motor of a watercraft, the method comprising:
   controlling the electric motor of the watercraft based on commands received from an accelerator of the watercraft; and
   in response to a motor reversal command, reversing a direction of rotation of the electric motor to expel an obstruction from a water intake of the watercraft, wherein reversing the direction of rotation of the electric motor causes a pump impeller of the watercraft to spin in an opposite direction.

19. The method of claim 18, wherein the motor reversal command is generated in response to a dedicated command from a user.

20. The method of claim 18, wherein the motor reversal command is generated in response to a sensor signal indicative of an obstruction in the water intake.

21. A method for operating an electric motor of a watercraft, the method comprising:
   controlling the electric motor of the watercraft based on commands received from an accelerator of the watercraft;
   receiving a sensor signal indicative of a surfacing of a water intake of the watercraft from at least one sensor of the watercraft, while the electric motor is in operation; and
   shutting off the electric motor for a temporary time period in response to receiving the sensor signal.

* * * * *